(12) United States Patent
Ross et al.

(10) Patent No.: US 11,416,859 B2
(45) Date of Patent: *Aug. 16, 2022

(54) METHODS OF AUTHENTICATING A USER FOR DATA EXCHANGE

(71) Applicant: Eckoh UK Limited, Hemel Hempstead (GB)

(72) Inventors: Cameron Peter Sutherland Ross, St. Albans (GB); James Heath, Brighton (GB); Thomas Edward Briden, Leighton Buzzard (GB); Ashley Burton, Watford (GB); Paul Downs, St. Albans (GB)

(73) Assignee: Eckoh UK Limited, Hemel Hempstead (GB)

( * ) Notice: Subject to any disclaimer, the term of this patent is extended or adjusted under 35 U.S.C. 154(b) by 180 days.

This patent is subject to a terminal disclaimer.

(21) Appl. No.: 17/073,543

(22) Filed: Oct. 19, 2020

(65) Prior Publication Data

US 2021/0035099 A1 Feb. 4, 2021

Related U.S. Application Data

(63) Continuation of application No. 15/859,840, filed on Jan. 2, 2018, now Pat. No. 10,846,693, which is a
(Continued)

(30) Foreign Application Priority Data

Jun. 21, 2016 (GB) ...................................... 1610846

(51) Int. Cl.
*H04L 9/00* (2022.01)
*G06Q 20/40* (2012.01)
(Continued)

(52) U.S. Cl.
CPC ............. *G06Q 20/40* (2013.01); *G06F 21/35* (2013.01); *G06F 21/44* (2013.01); *G06Q 20/02* (2013.01);
(Continued)

(58) Field of Classification Search
CPC ...... G06Q 20/40; G06Q 20/02; G06Q 20/105; G06Q 20/322; G06Q 20/388;
(Continued)

(56) References Cited

U.S. PATENT DOCUMENTS 7,685,629 B1 * 3/2010 White ...................... H04L 63/18
713/184
7,865,937 B1 * 1/2011 White ................ G06Q 20/3674
713/184
(Continued)

FOREIGN PATENT DOCUMENTS

EP 2 830 014 A1 1/2015

*Primary Examiner* — Gary S Gracia
(74) *Attorney, Agent, or Firm* — Blank Rome LLP

(57) ABSTRACT

A method of facilitating the exchange of data between a user having a computing device, and a remote entity, where a first connection has been established between the user and the remote entity, and where the user has associated data exchange information with an application on the computing device, the data exchange information defining properties of the data to be exchanged between the user and the remote entity. The method comprises establishing, at a server, a second connection to the computing device; enabling retrieval of a user authentication attribute associated with the data exchange information; enabling retrieval of a device authentication attribute associated with the data exchange information; enabling authentication of the user using the user authentication attribute; and enabling authentication of the computing device using the device authentication attribute, where data may be exchanged between the computing
(Continued)

device and the remote entity in accordance with the data exchange information following authentication of the user and the computing device.

18 Claims, 10 Drawing Sheets

Related U.S. Application Data continuation of application No. 15/628,112, filed on Jun. 20, 2017, now Pat. No. 9,892,409.

(51) Int. Cl.
| | |
|---|---|
| *G06Q 30/06* | (2012.01) |
| *G06F 21/35* | (2013.01) |
| *G06F 21/44* | (2013.01) |
| *G06Q 20/02* | (2012.01) |
| *G06Q 20/10* | (2012.01) |
| *G06Q 20/32* | (2012.01) |
| *G06Q 20/38* | (2012.01) |
| *H04L 9/40* | (2022.01) |
| *H04L 29/06* | (2006.01) |

(52) U.S. Cl.
CPC ......... *G06Q 20/105* (2013.01); *G06Q 20/322* (2013.01); *G06Q 20/388* (2013.01); *G06Q 20/40145* (2013.01); *G06Q 30/0609* (2013.01); *H04L 63/083* (2013.01)

(58) Field of Classification Search
CPC .......... G06Q 20/40145; G06Q 30/0609; G06F 21/35; G06F 21/44; H04L 63/083
See application file for complete search history.

(56) References Cited

U.S. PATENT DOCUMENTS

| | | | | |
|---|---|---|---|---|
| 8,245,044 | B2* | 8/2012 | Kang | G06Q 20/12 |
| | | | | 713/176 |
| 8,255,278 | B1* | 8/2012 | Young | G06Q 20/322 |
| | | | | 705/17 |
| 8,447,691 | B2 | 5/2013 | Kwong | |
| 8,620,666 | B1 | 12/2013 | Whitmore et al. | |
| 8,725,576 | B2 | 5/2014 | Fisher | |
| 9,001,975 | B2 | 4/2015 | Tolksdorf | |
| 9,027,085 | B2* | 5/2015 | Kula | H04L 9/3228 |
| | | | | 726/4 |
| 9,373,110 | B2* | 6/2016 | Sekiya | G06Q 20/388 |
| 9,424,429 | B1 | 8/2016 | Roth | |
| 9,652,771 | B2* | 5/2017 | Fisher | H04W 4/80 |
| 9,667,626 | B2* | 5/2017 | Lin | H04L 63/0815 |
| 9,740,375 | B2* | 8/2017 | Kruglick | G06F 3/1454 |
| 10,032,156 | B2* | 7/2018 | Al-Sahli | G06Q 20/1085 |
| 10,032,168 | B2* | 7/2018 | Kulkarni | A61L 31/145 |
| 10,089,607 | B2* | 10/2018 | Ziat | G06Q 20/3227 |
| 10,354,303 | B1* | 7/2019 | Ran | G06Q 30/0609 |
| 10,445,741 | B2* | 10/2019 | Cueli | G06Q 20/12 |
| 10,515,360 | B2* | 12/2019 | Chow | G06K 7/10366 |
| 10,579,996 | B2* | 3/2020 | Neuwirth | G06Q 20/382 |
| 10,846,695 | B2* | 11/2020 | Kim | G06Q 20/10 |
| 11,317,279 | B2* | 4/2022 | Wolosewicz | H04L 63/123 |
| 11,321,730 | B2* | 5/2022 | Bain | G06Q 30/0238 |
| 11,348,077 | B2* | 5/2022 | Naik | G06Q 20/1085 |

| | | | | |
|---|---|---|---|---|
| 2004/0049455 | A1 | 3/2004 | Mohsenzadeh | |
| 2007/0106517 | A1 | 5/2007 | Cluff et al. | |
| 2008/0046366 | A1 | 2/2008 | Bemmel | |
| 2008/0155655 | A1 | 6/2008 | Wankmueller | |
| 2009/0037982 | A1 | 2/2009 | Wentker | |
| 2009/0055282 | A1 | 2/2009 | Ondeck | |
| 2009/0106556 | A1* | 4/2009 | Hamid | H04L 63/18 |
| | | | | 713/176 |
| 2009/0171752 | A1 | 7/2009 | Galvin | |
| 2009/0235074 | A1* | 9/2009 | Salgarelli | G06Q 20/20 |
| | | | | 713/168 |
| 2010/0188991 | A1* | 7/2010 | Raleigh | H04L 47/20 |
| | | | | 370/252 |
| 2010/0327054 | A1 | 12/2010 | Hammad | |
| 2011/0035788 | A1* | 2/2011 | White | G06F 21/31 |
| | | | | 726/4 |
| 2011/0047605 | A1 | 2/2011 | Sontag et al. | |
| 2011/0061095 | A1* | 3/2011 | Wiseman | G06Q 20/12 |
| | | | | 709/227 |
| 2011/0231911 | A1* | 9/2011 | White | G06F 21/32 |
| | | | | 726/7 |
| 2011/0302646 | A1* | 12/2011 | Ronda | H04L 9/3268 |
| | | | | 726/9 |
| 2011/0306368 | A1 | 12/2011 | McCarthy | |
| 2012/0191557 | A1* | 7/2012 | Fisher | G06Q 20/102 |
| | | | | 705/21 |
| 2012/0246079 | A1 | 9/2012 | Wilson | |
| 2012/0255996 | A1 | 10/2012 | Ahmed | |
| 2012/0264405 | A1 | 10/2012 | Bravo | |
| 2013/0166450 | A1* | 6/2013 | Pama | H04W 12/068 |
| | | | | 455/411 |
| 2013/0226812 | A1* | 8/2013 | Landrok | G06Q 20/40145 |
| | | | | 705/67 |
| 2014/0207676 | A1* | 7/2014 | van Wel | H04L 67/61 |
| | | | | 705/44 |
| 2014/0245391 | A1* | 8/2014 | Adenuga | G06Q 20/40145 |
| | | | | 726/3 |
| 2014/0279514 | A1 | 9/2014 | Sharp | |
| 2014/0304837 | A1 | 10/2014 | Mogaki | |
| 2014/0310185 | A1* | 10/2014 | Staflin | G06Q 20/3227 |
| | | | | 705/71 |
| 2014/0344056 | A1* | 11/2014 | Maller | G06Q 30/0258 |
| | | | | 713/150 |
| 2014/0379563 | A1 | 12/2014 | Bazaz | |
| 2015/0095219 | A1 | 4/2015 | Hurley | |
| 2015/0111535 | A1 | 4/2015 | Song et al. | |
| 2015/0127475 | A1 | 5/2015 | Mushing | |
| 2015/0180863 | A1 | 6/2015 | Kobayashi | |
| 2015/0254747 | A1 | 9/2015 | Huang | |
| 2015/0287416 | A1 | 10/2015 | Brands et al. | |
| 2016/0098711 | A1* | 4/2016 | Patel | G06Q 20/3829 |
| | | | | 705/44 |
| 2016/0125407 | A1* | 5/2016 | Stafford | H04L 63/0853 |
| | | | | 705/75 |
| 2016/0132883 | A1* | 5/2016 | Evans | G06Q 20/3255 |
| | | | | 705/44 |
| 2016/0247144 | A1* | 8/2016 | Oh | G06K 7/083 |
| 2016/0253669 | A1* | 9/2016 | Yoon | G06Q 20/327 |
| | | | | 705/75 |
| 2016/0307194 | A1* | 10/2016 | Bhatnagar | H04L 63/0838 |
| 2017/0017957 | A1* | 1/2017 | Radu | G06Q 20/4012 |
| 2017/0286966 | A1* | 10/2017 | Kohli | G06Q 20/407 |
| 2017/0364897 | A1* | 12/2017 | Sarkar | G06Q 30/0643 |
| 2017/0364911 | A1* | 12/2017 | Landrok | G06Q 20/3825 |
| 2017/0364912 | A1 | 12/2017 | Ross | |
| 2018/0130548 | A1* | 5/2018 | Fisher | G06Q 20/3227 |

\* cited by examiner

METHODS OF AUTHENTICATING A USER FOR DATA EXCHANGE

This is a continuation of U.S. patent application Ser. No. 15/859,840, filed Jan. 2, 2018, which is a continuation of U.S. patent application Ser. No. 15/628,112, filed Jun. 20, 2017, now U.S. Pat. No. 9,892,409, which claims priority to United Kingdom Application No. 1610846.6, filed Jun. 21, 2016, the disclosures of which are hereby incorporated by reference.

FIELD OF THE INVENTION

Embodiments of the disclosure herein describe methods of authenticating a user for data exchange with a remote entity, including user authentication in payment transactions involving a contact centre.

BACKGROUND OF THE INVENTION

Customers may interact with contact centres in order to purchase items offered for sale by a particular merchant. In order to process customer orders, the contact centre is required to authenticate the customer. The customer is usually required to provide digits of a specific passcode, or other memorable information, which can be difficult for the customer to remember. In addition, it can be inconvenient for a customer to enter a code using the keypad of their device during the call with the contact centre.

Advances in payment technology have led to attempts to provide 'frictionless' payments, which are simple for the customer and have substantially reduced the need for customers to enter card details and additional security information. However, customers can still be expected to provide card details to contact centres. This may result in a negative experience for the customer, owing to a perceived security risk. In addition, a customer may be overheard providing card details or authentication information to the contact centre, increasing the potential for fraud.

A number of 'alternative' payment methods are currently available to customers, and are gaining increasing popularity. However, contact centres do not currently support payment using these alternative payment methods.

Some merchants use 3-D Secure® for authenticating customers. If a merchant is using 3-D Secure, a third party (such as a card issuer) authenticates the user. Thus, the authentication liability is accepted by the third party. The third party challenges the customer on the basis of information concerning the transaction. The customer may be required to enter a separate password or memorable information upon receiving a challenge from the third party. 3-D Secure authentication can present challenges to customers. For example, if the frequency of challenges by the third party is low, the customer may forget a unique password for the 3-D Secure authentication process.

A new version of the 3-D Secure specification has recently been issued, which aims to make the challenge and response easier for customers. The 3-D Secure specification provides for out-of-band (OOB) authentication with customers making payments through apps or websites. There exists a need to enable customers to interact with third parties in accordance with the revised 3-D Secure specification, for telephone-based transactions.

One aim of contact centres is to reduce the average time taken to deal with a customer's call, known as Average Handling Time (AHT). In addition, there is a desire to easily prove the authenticity of callers and the data being sent between callers and contact centres. Fraudulent usage of sensitive customer information is also a major concern within the industry. Contact centres must also be compliant with the Payment Card Industry Data Security Standard (PCI DSS), a framework for the secure handling of cardholder data.

The exchange of sensitive information between a caller and a remote entity (such as a contact centre agent) is not limited to payment transactions. The desire to authenticate users prior to the exchange of sensitive information extends across many industries. For example, a remote entity may be required to share sensitive or confidential information (such as medical information) with a caller. As another example, a remote entity may be required to deploy a resource to a caller's location, thus requiring a user to provide location information, which may result in the customer being rendered vulnerable in the event of misuse of this information.

Therefore, there exists a need for a simple user authentication method for communications with a remote entity so that data can be exchanged securely between the user and the remote entity.

SUMMARY OF THE INVENTION

An embodiment relates to a method of facilitating the exchange of data between a user having a computing device, and a remote entity, wherein a first connection has been established between the user and the remote entity, and wherein the user has associated data exchange information with an application on the computing device, the data exchange information defining properties of the data to be exchanged between the user and the remote entity, the method comprising establishing, at a server, a second connection to the computing device; enabling retrieval of a user authentication attribute associated with the data exchange information; enabling retrieval of a device authentication attribute associated with the data exchange information; enabling authentication of the user using the user authentication attribute; and enabling authentication of the computing device using the device authentication attribute, wherein data may be exchanged between the computing device and the remote entity in accordance with the data exchange information following authentication of the user and the computing device.

A further embodiment relates to a computer program comprising instructions that, when executed by a processor, enable a server comprising the processor to perform the above method.

Another embodiment relates to a server for facilitating the exchange of data between a user having a computing device, and a remote entity, wherein a first connection has been established between the user and the remote entity, and wherein the user has associated data exchange information with an application on the computing device, the data exchange information defining properties of the data to be exchanged between the user and the remote entity, the server comprising an authentication processor operable to establish a second connection to the application; enable the retrieval, from a user database storing the data exchange information, of a user authentication attribute associated with the data exchange information, and a device authentication attribute associated with the data exchange information; enable the authentication of the user using the user authentication attribute; and enable the authentication of the computing device using the device authentication attribute, wherein data may be exchanged between the computing device and the remote entity in accordance with the data exchange information following authentication of the user and the computing device.

A further embodiment relates to a method of facilitating the exchange of data between a user having a computing device, and a remote entity, wherein a first connection has been established between the user and the remote entity, and wherein an application is associated with the computing device, the method comprising establishing, by the application, a second connection to a server; sending data exchange information to the server, the data exchange information defining properties of the data to be exchanged between the user and the remote entity; sending a user authentication attribute associated with the data exchange information to the server; sending a device authentication attribute associated with the data exchange information to the server; and exchanging data with the remote entity in accordance with the data exchange information following authentication of the user using the user authentication attribute being enabled by the server, and authentication of the computing device using the device authentication attribute being enabled by the server.

Another embodiment relates to an application associated with a computing device and comprising a computer program, the application facilitating the exchange of data between the computing device and a remote entity, wherein a first connection has been established between a user of the computing device and the remote entity, the computer program comprising instructions for enabling the computing device to establish a second connection to a server; send data exchange information to the server, the data exchange information defining properties of the data to be exchanged between the user and the remote entity; send a user authentication attribute associated with the data exchange information to the server; send a device authentication attribute associated with the data exchange information to the server; and exchange data with the remote entity following authentication of the user using the user authentication attribute being enabled by the server and authentication of the computing device using the device authentication attribute being enabled by the server.

Another embodiment relates to a computing device comprising an application as described above.

A further embodiment relates to a method of facilitating the exchange of data between a user having a computing device, and a remote entity, wherein an application is associated with the user device, the method comprising establishing, a first connection between the user and the remote entity; establishing, at the server, a second connection to the computing device; at the application: sending data exchange information to the server, the data exchange information defining properties of the data to be exchanged between the user and the remote entity; sending a user authentication attribute associated with the data exchange information to the server; and sending a device authentication attribute associated with the data exchange information to the server; at the server: enabling the retrieval of the user authentication attribute associated with the data exchange information; enabling the retrieval of the device authentication attribute associated with the data exchange information; enabling the authentication of the user using the user authentication attribute; and enabling the authentication of the computing device using the device authentication attribute; and exchanging data between the computing device and the remote entity in accordance with the data exchange information.

Another embodiment comprises a system for facilitating the exchange of data between a user having a computing device, and a remote entity, wherein a first connection has been established between the user and the remote entity, the system comprising a computing device as described above and a server as described above.

DETAILED DESCRIPTION OF THE PREFERRED EMBODIMENTS

Figure 1:
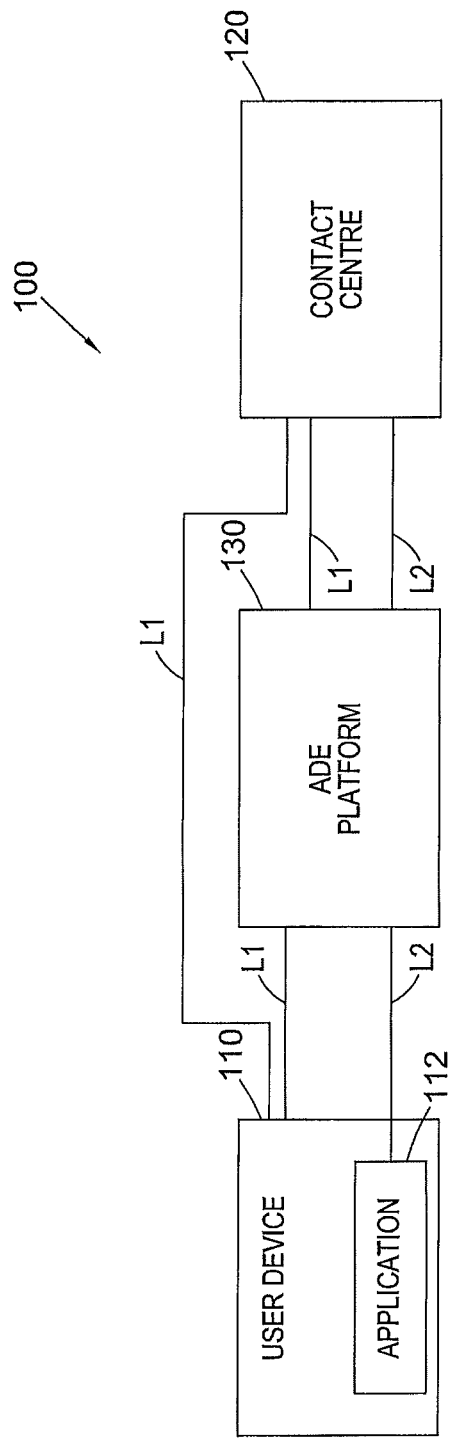
FIG. 1 shows a schematic diagram of an environment in which a user communicates with a contact centre, according to one described embodiment.

FIG. 1 shows a schematic diagram of an environment 100 in which a user, having a device 110, calls a contact centre 120 for the purpose of requesting a service offered by a company (for example, an order for an item sold by a merchant, or a recovery service offered by a roadside assistance company). An application 112 is installed on the user device 110, and facilitates the exchange of data with the contact centre 120. The environment 100 further comprises an authentication and data exchange (ADE) platform 130, which is operable to authenticate the user and their device 110 so that data may be exchanged securely between the user and the contact centre 120. Information may be transferred between the application 112 and the ADE platform 130 and between the contact centre 120 and the ADE platform 130. Calls from the user device 110 to the contact centre 120 may be routed via the ADE platform 130.

In certain embodiments, the application 112 on the user's device 110 (for example, a mobile phone, tablet, or computer) stores various payment methods. Such applications are commonly referred to as digital wallets. The application 112 may be a mobile application, computer application, or an application associated with a computer browser.

The proprietor of the application 112 may be a number of different entities. For example, the application 112 may be specific to the merchant or company that the user is calling (such as a cinema chain, having a cinema booking application, or a roadside assistance application, provided by a roadside assistance company). In another example, the proprietor of the application 112 may be the mobile network operator. In this case, the user may give the application 112 permission to share user data managed by the application 112 with contact centres 120 subscribing to a data share scheme initiated by the mobile network operator.

Alternatively, the application 112 may be associated with a particular card issuer. For example, a merchant may have signed up to a service offered by the card issuer wherein the contact centre can request user data from the ADE platform 130 associated with the card issuer's application 112, in order to process a transaction.

As will be appreciated, communications links enable communication among the entities described herein. Specific link types will be explained with reference to certain entities; however, in general, communications links between the entities may be implemented using wired or wireless communications technologies. Connections between entities may comprise internal links between modules of particular entities, or may be external links between distributed entities. For example, certain entities described herein may communicate via LAN, WLAN, PSTN, or via the Internet. Other implementations of communications links between the entities described herein will be apparent to persons skilled in the art.

In one aspect, link type L1 provides an audio connection, video connection, and/or data connection between the user device 110 and the contact centre 120. In some embodiments, link type L1 may be a bidirectional link. The connection between the user device 110 and the contact centre 120 may be routed via the ADE platform 130.

In one aspect, link type L2 provides for the exchange of data between the application 112 and the ADE platform 130, and between the ADE platform 130 and the contact centre 120. Link type L2 may be bidirectional.

Figure 2:
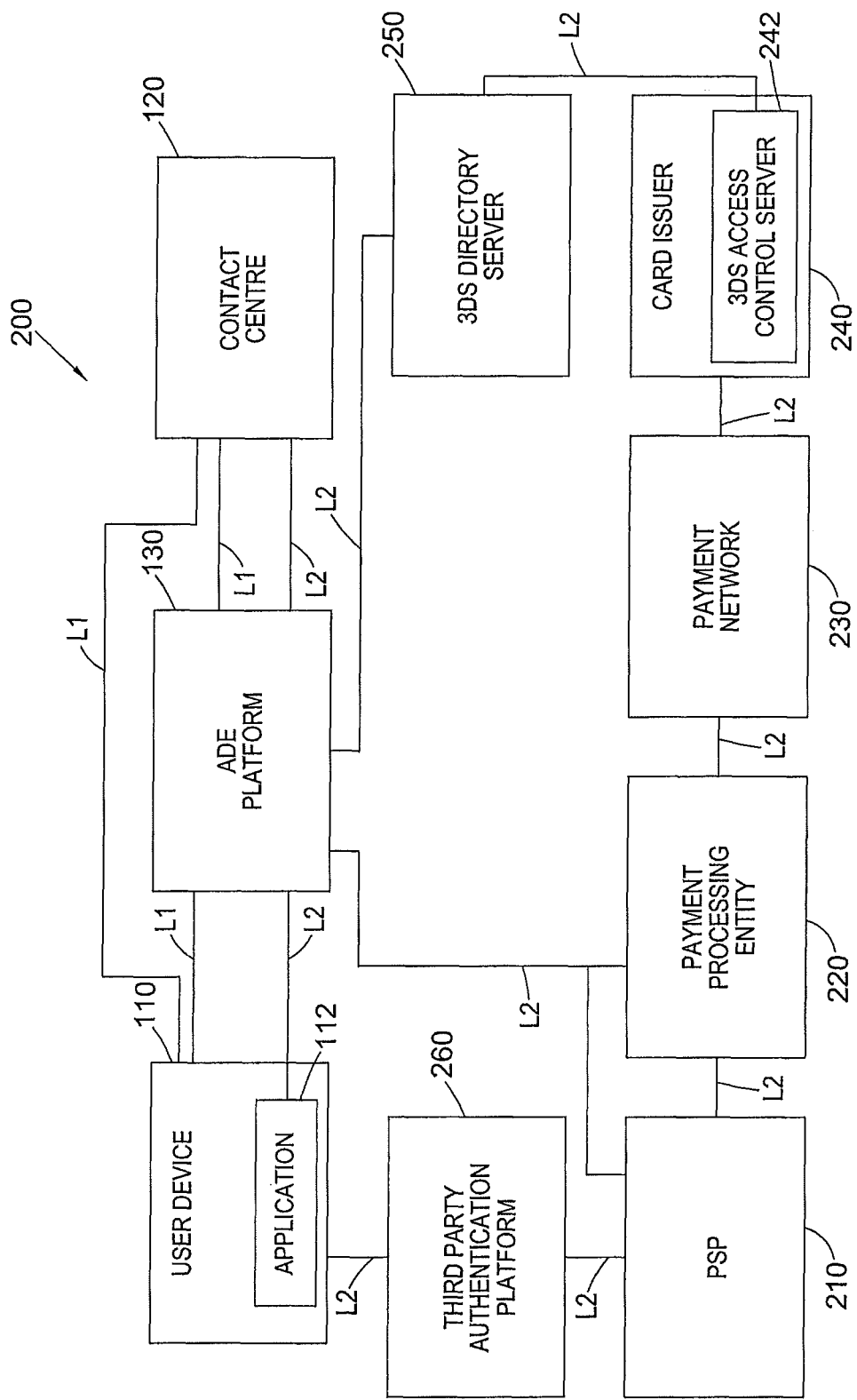
FIG. 2 shows a schematic diagram of an environment in which a user communicates with a contact centre for the purpose of facilitating a payment transaction, according to one described embodiment.

FIG. 2 shows a schematic diagram of an environment 200 which is specific to the facilitation of payment transactions. That is, the contact centre handles user transactions for entities sold by a particular merchant. In addition to the entities shown in FIG. 1, the environment 200 comprises a payment service provider (PSP) 210, a payment processing entity 220, a payment network 230, and a card issuer 240.

The PSP 210 provides a single interface to the merchant, enabling the merchant to accept a variety of different payment methods, for example credit cards, digital wallets, and alternative payment methods such as bank transfers and direct debits. The PSP 210 may be able to collect payments intended for the merchant and streamline these payments for simplified management.

The role of the payment processing entity 220 (commonly referred to in the payment industry as an acquirer) is to process transactions on behalf of the merchant. In effect, the payment processing entity 220 manages the merchant's bank account. The payment processing entity 220 passes sensitive information, via the payment network 230, to the card issuer 240 for authorisation and arranges payment for the merchant. As described above, these payments may be collected by the PSP 210 for streamlined payment to the merchant.

The payment network 230 manages and controls the operation and clearing of transactions. The payment network 230 passes sensitive information from the payment processing entity 220 to the card issuer 240 and passes payments back to the payment processing entity 220 so that the merchant can receive payment. Payment networks 230 include Visa®, MasterCard® and American Express®, among others, and may also include networks processing so-called "on us" transactions where the payment processing entity 220 and card issuer 240 are the same entity.

The card issuer 240 provides a payment card to the cardholder on behalf of the payment network 230. The card issuer 240 is responsible for transactions made using the card issued to the user. The card issuer 240 can generate an authorisation response either authorising or declining a transaction initiated by the user and can debit the customer's account accordingly.

In embodiments in which the merchant is using 3-D Secure (hereinafter abbreviated to "3DS" and described further with reference to the second embodiment below), the transaction environment 200 may further comprise a 3DS Directory Server 250 and the card issuer may comprise a 3DS Access Control Server (ACS) 242. The function of these entities is explained in further detail with reference to FIG. 9.

In embodiments in which authentication of the user and their device 110 is not carried out by the ADE platform 130 (i.e. the third embodiment described below), the transaction environment 200 may further comprise a third party authentication platform 260, operable to authenticate a user and their device 110 on the basis of information received from a third party application running on the user's device 110. The function of this entity is explained in further detail with reference to FIG. 10.

In one aspect, link type L2 further provides for the bidirectional exchange of data between the ADE platform 130, PSP 210, payment processing entity 220, payment network 230, card issuer 240, 3DS ACS 242, 3DS directory server 250 and third party authentication platform 260 as indicated in FIG. 2.

Figure 3:
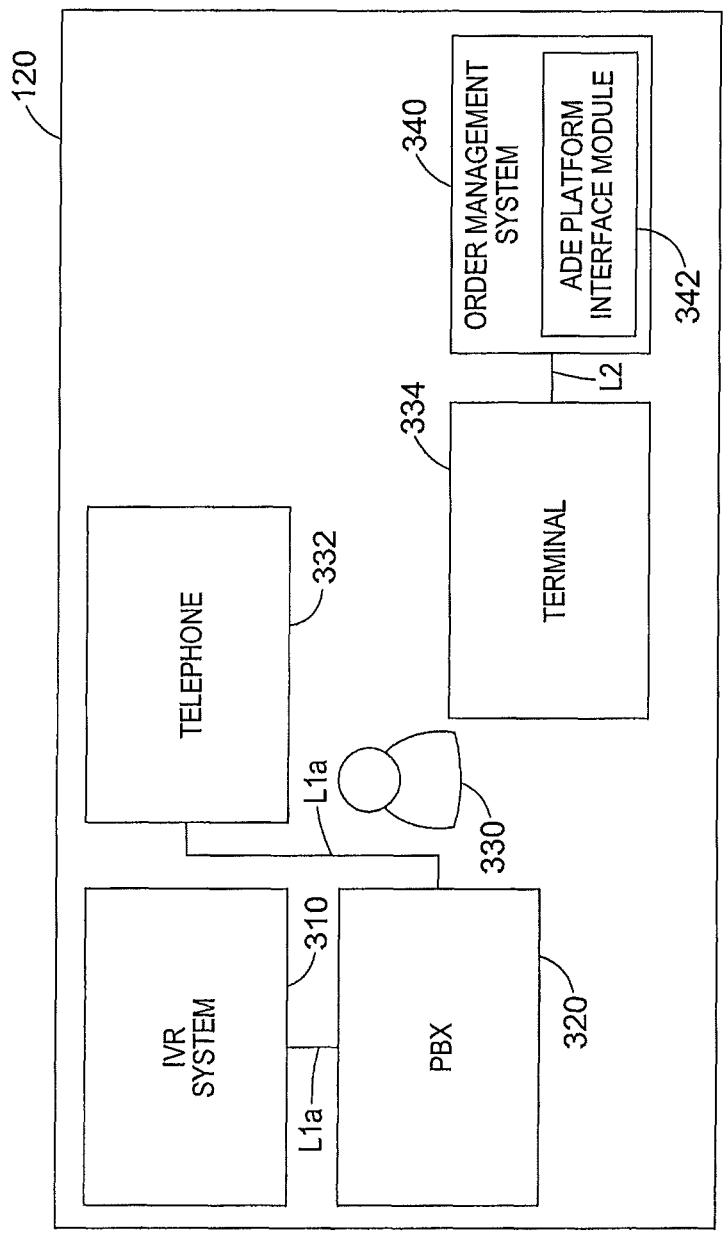
FIG. 3 shows a schematic diagram of a contact centre, according to one described embodiment.

FIG. 3 illustrates an example of the contact centre 120, in which a call from the user device 110 may initially be processed by an IVR system 310, before being switched by a PBX 320 and directed to a telephone 332 of a remote entity, such as an agent 330. The agent 330 may be able to place the order by completing a form displayed on the agent's terminal 334. Order information is passed to the order management system 340. User authentication and device authentication, as described herein, are facilitated by the ADE platform interface module 342 of the order management system 340. The ADE platform interface module 342 is operable to exchange relevant information with the ADE platform 130.

In one aspect, link type L1a provides for the routing of audio data from a user device 110, via the IVR system 310 and PBX 320, to the telephone 332 of the agent 330. Link type L1a may be a bidirectional link, enabling audio data originating from the contact centre agent 330, PBX 320 or IVR system 310 to be delivered to the user device 110. Link type L2 further provides for the bidirectional exchange of data between the agent's terminal 334 and the order management system 340. The ADE platform interface module 342 may comprise a processor (not shown) operable to query the order management system 340 and exchange data with the ADE platform, via link type L2, as indicated in FIGS. 1 and 2.

Figure 4:
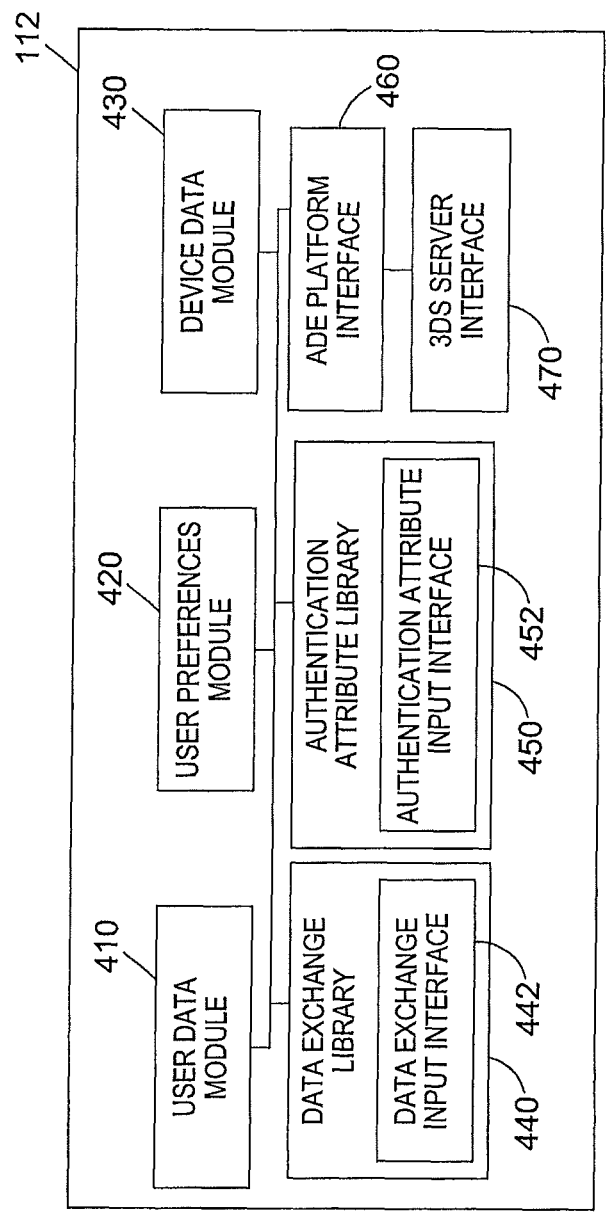
FIG. 4 shows a schematic diagram of an application running on a user's device, according to one described embodiment.

FIG. 4 illustrates the modules comprising an application 112 running on the user's device. The application 112 may comprise a user data module 410, storing data relating to the user of the device 110 (such as name, email address, etc.), a user preferences module 420, storing user preferences associated with aspects of the application 112, and a device data module 430 storing data relating to the user's device 110 (such as telephone number, IMEI, etc.).

The application 112 may further comprise a data exchange library 440, storing information associated with the exchange of data with a contact centre 120. The data exchange information may define properties of the data to be exchanged between the user and the remote entity. For example, the data exchange information may comprise financial information (defining properties of the user's debit card(s), credit card(s), and/or loyalty card(s)), methods of sharing sensitive information (defining properties associated with the sharing of GPS data, text, image data, or audio or video data), or information identifying the sensitivity of the data to be exchanged (defining properties such as 'administrative', or 'patient confidential'). The data exchange library 440 may comprise a data exchange input interface 442, enabling the user of the device 110 to input data exchange information for storage in the data exchange library 440. If the data exchange information comprises financial information, the data exchange information stores properties of the user's payment cards such as the primary account number (PAN), card expiry date, or a token for the PAN.

The application 112 may comprise an authentication attribute library 450, storing information identifying an authentication attribute type associated with each data exchange entry in the data exchange library 440. For example, the authentication attribute library 450 may store an indication that a voice biometric is the authentication attribute associated with a particular credit card, or that a fingerprint is the authentication attribute associated with the exchange of data classified as 'patient confidential'.

The authentication attribute library 450 may comprise an authentication attribute input interface 452, operable to enable a user to associate an authentication attribute with an entry in the data exchange library 440. For example, the authentication attribute input interface 452 may be operable to record a sample of a user's speech, or to enable the user to set a passcode.

An ADE platform interface 460 is operable to send the data exchange information stored in the data exchange library 440, and the authentication attribute types stored in the authentication attribute library 450, to the ADE platform 130. The ADE platform interface 460 may, for example, send any sensitive information (such as credit card details) to the ADE platform 130 for storage, so that an identifier or token may be stored in the data exchange library 440, in place of the sensitive information.

In addition, the ADE platform interface 460 may send the authentication attributes (such as voice biometrics, passcodes, fingerprint information) to the ADE platform 130 for storage.

The ADE platform interface 460 may also send information associated with the data exchange information, authentication attributes and authentication attribute types from the user data module 410, the user preferences module 420, and the device data module 430, to the ADE platform 130.

The application 112 may also comprise a 3DS server interface 470, operable to exchange relevant information with a 3DS server hosted at the ADE platform 130, in accordance with the second embodiment described below. For authentication of users in transactions in which the merchant is using 3DS, the application 112 includes the 3DS SDK component, as required by the latest version of the 3DS specification.

Each of the user data module 410, user preferences module 420 and device data module 430 may comprise instructions for execution by a processor (not shown) of the user device 110 that, when executed by the processor, enable the storage of user data, user preferences and device data, respectively, in the local storage of the user device 110. Further, each of the data exchange library 440 and authentication attribute library 450 may comprise instructions for execution by the processor, enabling the storage of data exchange information and authentication attributes, respectively, in local storage (not shown) of the user device 110.

The data exchange input interface 442 and the authentication attribute interface 452 may each comprise instructions for execution by the processor, enabling a user to enter, respectively, data exchange input information and authentication attributes. Upon execution of these instructions, the processor may configure a display (not shown) of the user device 110 to provide options for the input of alphanumeric data. The instructions may further configure the user device 110 to record an audio input from the user, and configure the processor to extract the data exchange input information from the recorded audio data. For the data exchange input interface 442, the instructions for execution by the processor may enable the extraction of alphanumeric data from a photographic image. For the authentication attribute interface 452, the instructions may configure the processor to generate a voice biometric from the recorded audio sample.

The ADE platform interface 460 may comprise instructions for execution by the processor, enabling the retrieval of information from the user data module 410, user preferences module 420, device data module 430, data exchange library 440, and authentication attribute library 450, upon receipt of commands from the ADE platform 130. Further, the 3DS server interface 470 may similarly comprise instructions for execution by the processor, enabling the user device 110 to send data to a 3DS server hosted at the ADE platform 130.

Persons skilled in the art will appreciate that the functionality of the application 112 may be delivered by more than one application. For example, a first application may interact with the ADE platform 130 (via the ADE platform interface 460) while a second application contains the data exchange library 440. In this way, a user's financial information may be maintained separately from other customer data which is specific to the first application.

In another example, one of the data exchange information entries in the data exchange library 440 may be a third party payment method, which requires interaction with a separate third party payment application. Thus, a first application may interact with the ADE platform 130 so that the user can choose to pay in accordance with one of the entries in the data exchange library 440, and in the event that the user selects the third party payment method, the third party payment application may authenticate the user and their device 110.

Accordingly, references to the application 112 herein may be interpreted as one or more applications, if the functionality described with reference to the application 112 is in fact provided by more than one application.

Figure 5:
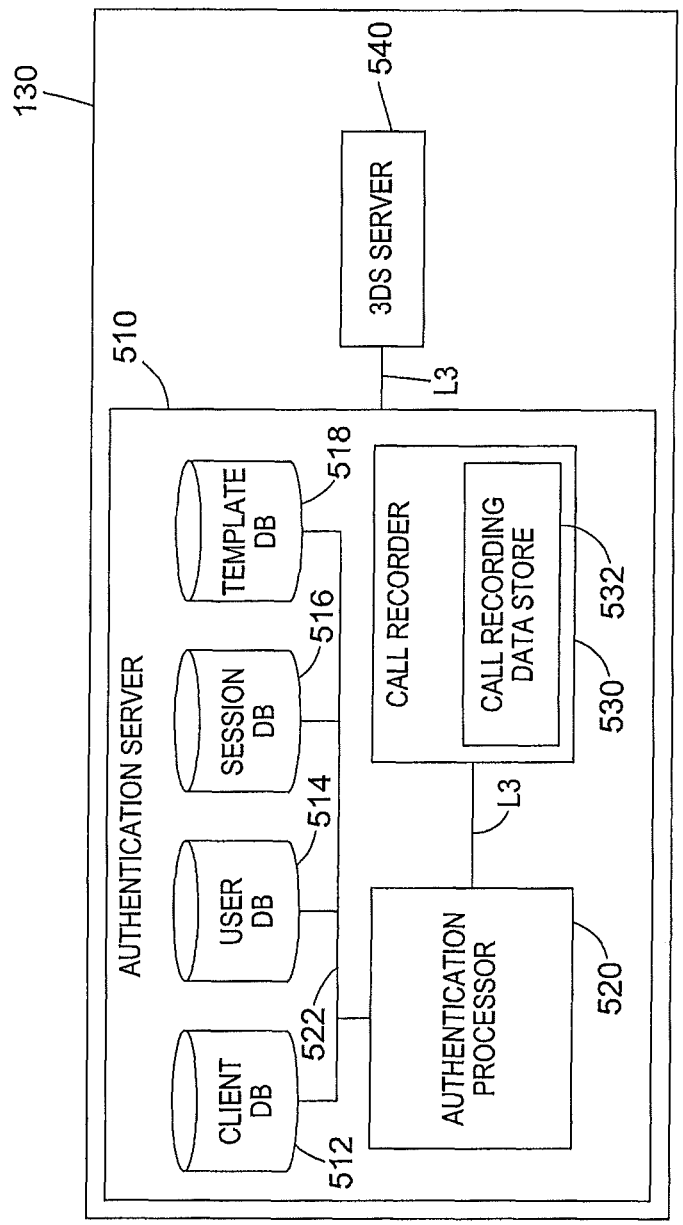
FIG. 5 shows a schematic diagram of an authentication and data exchange platform, according to one described embodiment.

FIG. 5 shows an authentication and data exchange (ADE) platform 130, according to one embodiment. The ADE platform 130 includes an authentication server 510 comprising an authentication processor 520.

The authentication server 510 may comprise a client database 512, containing details of entities signed up for the service provided by the ADE platform 130. The client database 512 may also provide details of companies or merchants associated with the application 112 provided by the entity in conjunction with the ADE platform 130, and which can request information from the ADE platform 130.

The authentication server 510 may further comprise a user database 514, containing details of all users having the application 112 associated with the ADE platform 130 on their device 110. The user database 514 contains the data sent to the ADE platform 130 from the ADE platform interface 460 of the application 112 (that is, the data exchange information registered with the application 112 and the user authentication attribute associated with each data exchange entry in the data exchange library 440 of the application 112). For example, the user database 514 may store the payment methods registered with the application 112 and the user authentication attribute associated with each payment method.

The authentication server 510 may further comprise a session database 516, containing details of the specific session associated with the user's call to the contact centre 120. The session database 516 may store information received from the ADE platform interface module 342 of the contact centre's order management system 340. Continuing the transaction-based example, the session database 516 may store details of the payment transaction that the user is attempting to make (for example, payment amount, payment method, authentication status, authorisation status, transaction date and time).

In addition, the authentication server 510 may comprise a template database 518, containing templates for processing transactions in which the user wishes to pay with a third party mobile payment application, in accordance with the third embodiment described below.

The authentication processor 520 may be operable to query the databases 512, 514, 516, 518 maintained by the authentication server 510, on the basis of information received at the ADE platform 130. A bus 522 or a wireless communications link may enable the bidirectional exchange of data between the authentication processor 520 and the databases 512, 514, 516, 518.

In addition, the authentication server 510 may comprise a call recorder 530, operable to record a portion of the call from the user, and a call recording data store 532, operable to store the sample of the call recorded by the call recorder 530. In one aspect, link type L3 provides for the bidirectional exchange of data between the call recorder 530 and the authentication processor 520.

Persons skilled in the art will appreciate that some of the functionality of the ADE 130 may be stored at or delivered by third parties. For example, portions of the user database 514, such as user authentication attributes, may be held by one or more third party user identity stores.

If the merchant uses 3DS, the ADE platform 130 may further comprise a 3DS server 540, operable to carry out functions relating to the authentication of users as part of the 3DS process, in accordance with the second embodiment described below. This is explained in further detail with reference to FIG. 9. In one aspect, link type L3 further provides for the bidirectional exchange of data between the authentication server 510 and the 3DS server 540.

Figure 6:
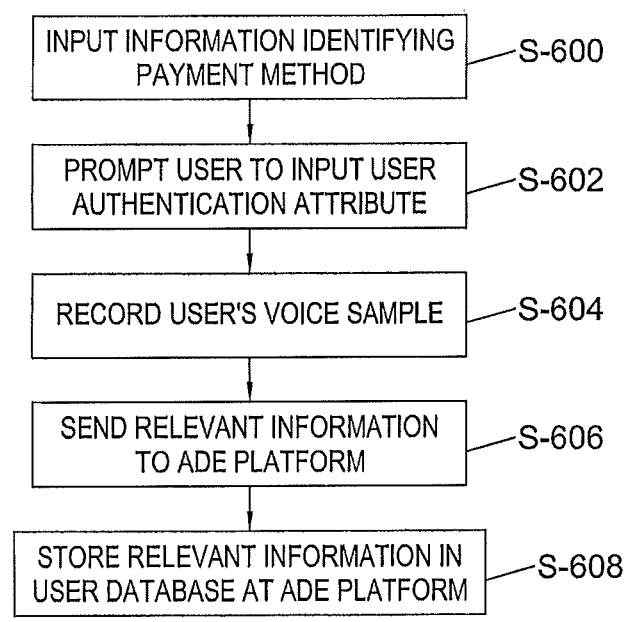
FIG. 6 is a flowchart of a method of enrolling data exchange methods with the application, according to one described embodiment.

In accordance with some embodiments, described in further detail below, a user is required to complete an enrolment process, in which data exchange information is registered with the application 112. For example, payment methods may be registered with the application 112. Payment methods may include credit or debit cards, alternative payment services (such as PayPal® or Amazon Payments), Bitcoin®, direct bank transfers, and loyalty points programmes. An example of an enrolment process for a transaction-based embodiment is illustrated in FIG. 6.

In step S-600, a user inputs information identifying a payment method, using the data exchange input interface 442. For example, a user may type in a particular card number and corresponding CV2 number. In step S-602, a user is prompted to input a user authentication attribute, using the authentication attribute input interface 452. The application 112 may request the user to say a statement, such as "I want to pay with [payment method]".

In step S-604, the application 112 records the user's voice sample, generates a voice biometric representing the sample and associates the voice biometric with the payment method. Then, in step S-606, the application 112 sends information identifying the user's registered payment method, the associated user authentication attribute, and unique user device information, via the ADE platform interface 460, to the ADE platform 130. Finally, in step S-608, the ADE platform 130 stores the information identifying the user's payment method, the associated user authentication attribute and the user device information in the user database 514. The unique user device information is stored at the ADE platform 130 as a device authentication attribute associated with the payment method.

Alternative methods of inputting information identifying a payment method include taking a photograph of a payment card, or recording the card number and CV2 number with the application using voice recognition.

As explained further below, the user authentication attribute input in step S-602 is not necessarily a voice biometric. Any biometric representing a property of the user may be associated with the payment method. Other examples of biometric authentication attributes include a photograph of the user's face, a scan of the user's iris, or a record of the user's fingerprint.

Alternatively, a behavioural characteristic may be used as the user authentication attribute. Example behavioural properties may include the way in which the user signs their name, or a sample of the user's gait.

As a further alternative, the user authentication attribute may be something that the user owns, such as an RSA key or a physical token, or something that the user knows, such as a password, personal identification number (PIN), or a code for unlocking the lock screen of the user's device 110.

In step S-604, conversion of the user authentication attribute from the input format to the format in which it is stored in the user database 514 (for example, from audio data to a voice biometric) may be effected by the application 112, by the ADE platform 130, or by a third party.

Persons skilled in the art will appreciate that the method described with reference to FIG. 6 may be applied to enrolment processes associated with applications 112 for authenticating users for other purposes. For example, the user may input methods of sharing sensitive information with a roadside assistance company, or classification levels of sensitive data to be exchanged with a healthcare company, in step S-600.

Figure 7:
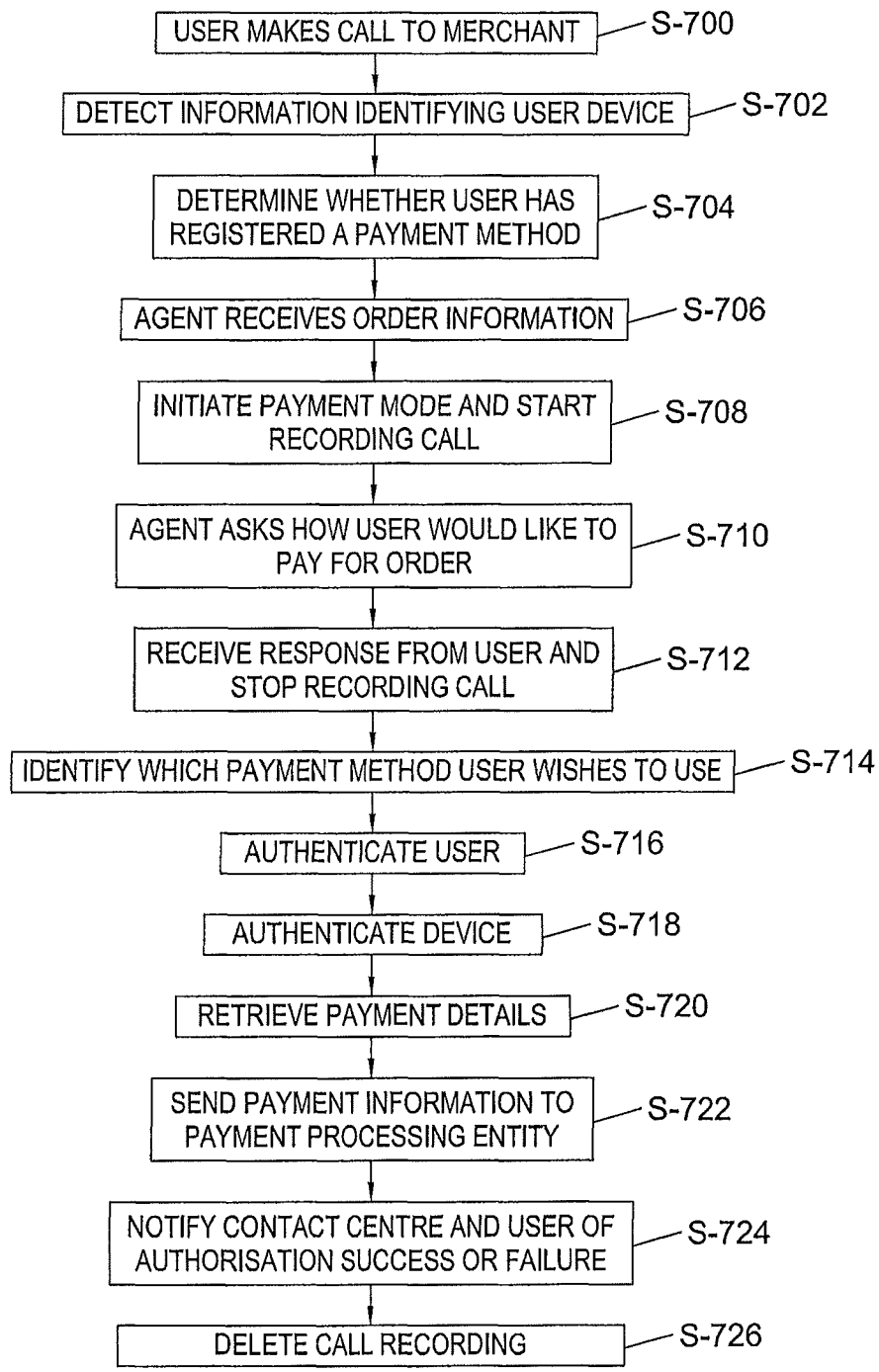
FIG. 7 is a flowchart of a method of authenticating a user in a payment transaction, according to one described embodiment.

An example process for authenticating a user as part of a payment transaction, according to a first embodiment, is illustrated in FIG. 7. In this example, incoming calls to the merchant are handled by the contact centre 120, and the merchant is registered with the ADE platform 130. In step S-700, a user makes a call to the merchant. The call is routed via the ADE platform 130. At the contact centre 120, information identifying the user device 110 (such as the user's caller line identification (CLI)) is detected in step S-702.

In step S-704, the IVR system 310 sends a request, via the ADE platform interface module 342, to the ADE platform 130, in order to discover whether the user has registered a payment method with the application 112 on the user's device 110. The authentication processor 520 may query the user database 514 with the user's CLI in order to retrieve a user ID, and subsequently determine whether any registered payment methods are associated with the user ID.

If the user has not registered a payment method with the application 112 on their device 110, or if the user does not have the application 112, the transaction proceeds in the same way as a conventional telephone-based transaction. If, however, the user has registered one or more payment methods, the authentication server 510 generates a unique session ID and stores this in the session database 516. The call is then put through to an agent 330 within the contact centre 120.

In step S-706, order information is received from the user. For example, the agent 330 may ask the user what they would like to purchase and the user may respond. The agent 330 may then confirm whether the desired item is available. In step S-708, the ADE platform 130 is notified that its payment mode should be initiated. For example, the order management system 340 may detect that the agent 330 has navigated to a URL of a webpage comprising elements for entry or selection of a user's payment details. The authentication server 510 initiates the payment mode of the ADE platform 130 and starts recording the user's call at the call recorder 530.

In step S-710, the agent 330 asks the user how they would like to pay for the order. The question from the agent 330 may be in response to a notification that the user has registered one or more payment methods with the application 112 on their device 110. In step S-712, the user replies with "I want to pay with [chosen payment method]". The call recorder 530 stops recording the call and stores the recorded sample in the call recording data store 532.

In step S-714, the ADE platform 130 identifies which registered payment method the user wishes to pay with. For example, the authentication processor 520 may compare the recorded sample of the caller's speech (stored in the call recording data store 532) with any payment methods listed against the user ID in the user database 514. The authentication processor 520 may use speech recognition to match the payment method recited in the recorded sample with a payment method listed in the user database 514.

In step S-716, the authentication server 510 authenticates the user. For example, the authentication processor 520 may retrieve the user authentication attribute (e.g. voice biometric) associated with the identified payment method from the user database 514. The authentication processor 520 may then compare the voice biometric retrieved from the user database 514 with the recorded sample stored in the call recording data store 532. If the stored recorded sample and voice biometric match, or are deemed to match based on an acceptable confidence level, the user is authenticated.

If the user is authenticated, the method proceeds to step S-718, in which the authentication server 510 authenticates the user's device 110. For example, the authentication processor 520 may poll the application 112 running on the user's device 110 with a request for unique information associated with the device 110 (such as that managed by the device data module 430). Upon receipt of this unique information, the authentication processor 520 compares the received information with the device authentication attribute stored in the user database 514. If the received information and stored user device information match, the user's device 110 is authenticated.

If the user's device 110 is authenticated, the method proceeds to step S-720, in which the user's payment details are retrieved by the authentication server 510. For example, the authentication processor 520 may query the user database 514 for information identifying the user's chosen payment method (such as a payment token associated with that payment method). The authentication server 510 sends the payment information to the payment processing entity 220, in step S-722, and subsequently receives a message indicating whether the transaction has been authorised or declined by the card issuer 240.

In step S-724, the authentication server 510 notifies the contact centre agent 330 of the success or failure of the transaction, and the agent 330 subsequently notifies the user. The user may then terminate the call. In step S-726, the authentication server 510 may delete the recorded sample from the call recording data store 532.

Persons skilled in the art will appreciate that various modifications may be made to the above process. Alternative steps are outlined in the following paragraphs.

The call from the user in step S-700 may be made using a mobile phone, tablet, or computer, or any other computing device with the functionality to establish a connection and communicate with a contact centre 120 handling calls on behalf of merchant for the purposes of carrying out a transaction. Alternatively, the call from the user may be made using a landline, as long as the user is in possession of one of the foregoing devices 110 and is able to interact with the application 112 running on the device 110 while speaking to the agent 330 via the landline telephone.

As an alternative to routing the call via the ADE platform 130 in step S-700, the call may be received at the contact centre 120 without being routed via the ADE platform 130. In this case, the ADE platform 130 may be notified that a user has made a call to the contact centre in step S-704 (and may also be notified of the caller's CLI), at the same time as being queried to determine whether the user has registered a payment method with the application 112 on the user's device 110.

The connection between the user and the agent 330 may be an audio connection (for example, PTSN, SIP, or WebRTC audio), a video connection, a data connection, or a combination thereof. The connection may be established directly between the contact centre 120 and the user, or via a hosted telephony service or third party.

The merchant may utilise a contact centre 120 employing human agents 330 for interacting with customers, an IVR system 310, or a combination of both. If the contact centre 120 employs an IVR system 310, this could be hosted by a third party (thus the IVR system 310 may not be physically located at the contact centre 120). Transaction handling may be outsourced by the merchant to a third party, who may handle the transaction on behalf of the merchant.

In step S-702, a unique wallet code, customer ID, or application ID, or the user's IMEI number, may be used instead of the CLI information. The information detected should be unique to the user's device 110, or to the user. The information identifying the user may be detected in a number of ways. For example, the unique code or ID may be recited by the user and typed in by the agent 330, or processed by a voice recognition service. Therefore, the call may be put through to an agent 330 directly, instead of being handled by the IVR system 310.

Alternatively, the user may input the identifying information using a keypad, which may be relayed to the contact centre 120 as DTMF tones. As a further alternative, steganographic audio may be played to the contact centre 120 by the application 112 on the user's device 110. The identifying information does not need to be relayed to the contact centre 120 using audio: a data connection may be used. If a data connection is used, the identifying information may be a property of the data connection between the user and the contact centre 120.

Whatever identifying information is used should also be passed to the ADE platform 130 during the enrolment process, so that the authentication processor 520 can later retrieve the registered payment methods for the user, when required. Thus the application 112 may be required to determine the identifying information at the point of enrolment, and send this information to the ADE platform 130.

The ADE platform 130 may receive the notification in step S-708 upon detection of a particular stage in the payment process, or in response to a command entered by the agent 330 at the contact centre 120. As an alternative to steps S-708 to S-712, a portion of the user's call may be recorded at the contact centre 120, and passed to the ADE platform 130.

In step S-712, the user's reply may be recorded at the user's device 110 and sent to the ADE platform 130 for identification of the payment method and authentication of the user. For example, the ADE platform 130, upon initiation of its payment mode, may send a command to the application 112 to record a sample of the user's speech and return the recorded sample to the ADE platform 130.

The payment method may be identified in step S-714 in different ways. The user may select a payment method from a drop-down list associated with the data exchange library 440 of the application 112 and this choice may be sent to the ADE platform 130 by the application 112. Alternatively, the user's different payment methods may be visible to the agent 330 at the contact centre 120, in which case the agent 330 may select the payment method in response to the user stating which payment method they wish to use.

Alternatively, the choice of payment method may be made using pre-set rules. For example, the user may have only registered a single payment method with the application, and thus no choice is required. Alternatively, the user may have a default payment method for all transactions, registered in the user preferences module 420. The pre-set rules may extend to the payment methods accepted by a merchant: if certain payment methods are not accepted, these may be excluded from the selection of payment methods.

As noted above, the user authentication attribute does not need to be a voice biometric. The information obtained by the authentication processor 520 must match the type of user authentication attribute associated with the payment method, in order to authenticate the user in step S-716. In the flowchart of FIG. 7, the same medium is used for identifying a user's payment method and for authenticating the user. If a user identifies the payment method in a different way (for example, by selecting from a drop-down list), the user may be prompted to provide information for authentication separately. For example, the agent 330 may request that the user place their fingerprint on a fingerprint reader or enter a unique passcode, following identification of the payment method.

An acceptable confidence level is used in step S-716 to authenticate the user using the recorded sample and the user authentication attribute. It will be appreciated that in some cases, the user authentication input (i.e. the information obtained by the authentication processor 520), for example a recorded voice sample, will not match the user authentication attribute exactly. Thus, a percentage match (such as a 90% match) may be used as an acceptable confidence level for user authentication in which an exact match is unobtainable. For other user authentication inputs (such as a unique passcode), an exact match is possible; thus the acceptable confidence level for user authentication in which an exact match is obtainable may be 100%.

Step S-716 may also comprise the receipt, at the contact centre 120, of the authentication attribute type, based on information retrieved from the user database 514 by the authentication processor 520. Therefore, the agent 330 may be able to prompt the user to provide the authentication information based on the authentication attribute type.

If the user cannot be authenticated in step S-716 using voice biometrics or another default user authentication attribute type, additional 'fallback' methods may be used. For example, the user may be provide their fingerprint, or enter specific digits of a pre-set password. Another 'fallback' method may require the user to input their CV2 number using the keypad of their device 110, or directly into an interface provided by the application 112.

Additional methods may be employed to increase the authentication confidence. For example, the authentication server 510 may issue a passphrase to the application 112 running on the user's device 110, and to the agent's terminal 334 at the contact centre 120. The user may then repeat the passphrase so that the agent 330 can verify that the user is at their registered device 110.

Further, additional information associated with the user (such as mobile phone type, cell tower location) may be retrieved from the device 110 by the application 112 and provided to the contact centre 120. This additional information can be used to increase authentication confidence and/or to perform a fraud check. The fraud check may be based on data specific to the device 110 (such as the geolocation of the device 110), information related to the specific communication (such as cell tower location or the audio characteristics of the phone call), information relating to the user (such as voice stress detection), or a combination thereof.

The unique information associated with the device 110 and used for device authentication in step S-718 may be any unique property of the user's device 110 (for example, the IMEI number). The information received in step S-702 may be re-used in step S-718 for device authentication. Alternatively, the user device 110 may be authenticated in step S-702. The information used for device authentication may be relayed to the ADE platform 130 using a data connection or by any other suitable means (such as steganographic audio).

In step S-722, the payment information may alternatively be sent to the PSP 210 and forwarded to the payment processing entity 220. The implementation may be specific to the merchant and dependent on the functionality of the ADE platform 130 (for example, whether the ADE platform 130 incorporates certain functionality of the PSP 210).

In step S-724, the authentication server 510 may additionally send a notification to the application 112 running on the user's device, so that the user is notified of the success or failure of the transaction by the application 112, as well as by the agent 330. The notification sent to the application 112 may include any information related to the transaction (such as the information stored in the session database 516). For example, this information may include the merchant name, and the transaction amount, time and date. The notification sent to the application 112 may take the form of a digital receipt.

In step S-726, the recorded sample may be retained to improve future authentication activities, or for other reasons.

The multiple-factor authentication method described above provides several advantages. For the user, the payment is 'frictionless': the user is not required to read out or type in card details. In addition, the user may not be required to remember any passwords, PINs, or other memorable information in order to confirm their identity to the contact centre 120.

If a voice biometric is the user authentication attribute associated with a particular payment method, the user may not be not required to enter a password or CV2, provide a fingerprint, password or passcode, or read out a SMS one-time password (OTP). By authenticating the user using a sample of the user's speech, the user is not required to remove their device 110 from their ear. This provides a seamless payment experience to the user, without disrupting the phone call.

For contact centres 120, security is enhanced as the user and their device can be authenticated. In addition, the AHT is reduced, as the process is more efficient. As no card data is exchanged, the call may be handled by an agent outside of the contact centre's PCI DSS cardholder data environment (CDE).

For the proprietor of the application 112, the above process increases the number of users using their application 112, thus improving brand awareness.

The multiple-factor authentication method described with reference to FIG. 7 is not limited to use in processing payment transactions. In fact, through the use of an application 112 running on a user's device 110, the method described above may be extended to any process for authenticating a user who is communicating with a contact centre 120, prior to the exchange of secure data between the user and the contact centre 120.

Figure 8:
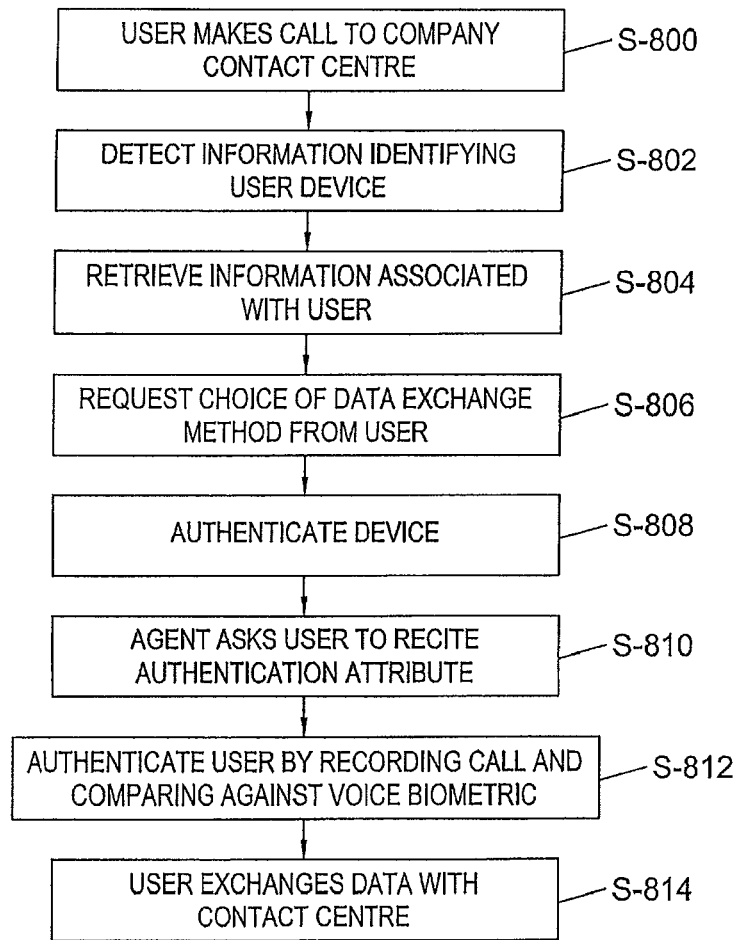
FIG. 8 is a flowchart of a method of authenticating a user in a roadside assistance scenario, according to one described embodiment.

An example of an alternative aspect of the first embodiment is described with reference to FIG. 8, which shows an alternative use of the above process. In this scenario, the application 112 running on the user device 110 is a roadside assistance application, and the user is communicating with a contact centre 120 which handles emergency calls for the roadside assistance company. The enrolment process may require the user to register their details after downloading the application 112 and provide a user authentication attribute (such as a voice sample). The application 112 sends this information to the ADE platform 130, which stores the user details, user authentication attribute, and information identifying the user device 110 in the user database 514.

In step S-800, a user makes a call to the roadside assistance company. Again, the call is routed via the ADE platform 130. Information identifying the user device 110 (such as the CLI) is detected in step S-802. The authentication processor 520 queries the user database 514 with the information identifying the user device 110 in step S-804, in order to retrieve information associated with the user.

The agent 330 may determine, from the information retrieved from the user database 514, that the user has authorised a number of different methods of exchanging data with the roadside assistance company. For example, the user may have authorised the exchange of GPS data, so that the roadside assistance company can locate the user and their vehicle. As another example, the user may have authorised the exchange of pictures or video captured by the user device 110 using the application 112, so that the roadside assistance company can assess the severity of the incident, deploy an appropriate recovery vehicle, and/or determine whether proximate assistance vehicles have the necessary equipment to repair the user's vehicle at the roadside.

Thus, in step S-806, the agent may request that the user choose which data exchange method to use. The user may select the chosen data exchange method from a drop-down list associated with the data exchange library 440 or using other techniques explained above with reference to FIG. 7. In addition, the agent 330 may ask the user whether they wish to add another data exchange method to the list of data exchange methods. For example, the user may have authorised the exchange of GPS information, but not images of the incident.

Each different data exchange method may have an associated user authentication attribute. Alternatively, all data exchange methods may be associated with the same user authentication attribute. This also applies for the information used for device authentication. That is, the information identifying the user device 110, obtained in step S-802, may be used to authenticate the user device 110, in step S-808. Else, the authentication processor 520 may obtain unique information from the device 110, for device authentication.

In step S-810, the contact centre agent 330 prompts the user to recite their full name, after identifying that a voice sample of the user's name is the user authentication attribute associated with the chosen data exchange method. In step S-812, the user's speech is recorded and compared against the voice biometric stored in the user database 514. If the recorded sample and stored sample match, or match to within an acceptable confidence level, the user is authenticated.

In step S-814, the user exchanges data with the contact centre 120 using the device 110. As both the user and device 110 have been authenticated, sensitive or secure information may be exchanged between the user and the contact centre 120 using the data exchange method chosen by the user in step S-806. In this example, the user may use the roadside assistance application 112 to capture a photograph of the incident, and exchange this with the contact centre agent 330. Alternatively or additionally, by the user's choice of data exchange method, the contact centre agent 330 may be able to see live images of the incident, captured by a camera (not shown) of the user's device 110.

Other implementations of the multiple-factor authentication method described herein will be appreciated by persons skilled in the art. For example, a merchant may authenticate a user and their device 110 so that the user can select an address to which their order should be delivered. This process may occur at step S-724 of FIG. 7, prior to termination of the call. Alternatively, address selection may be a separate process, such as a request from a user to modify a previously selected delivery address.

Another example of an alternative use of the first embodiment may involve a user communicating with a healthcare company. The application 112 running on the user's device 110 may be a healthcare application, with which the user has registered the options of booking an appointment, or receiving test results, and associated user authentication attribute(s). After initiating the call, the user may choose whether they wish to book an appointment or receive test results. Different user authentication attributes may be associated with each option. Following authentication of the user's device 110 and the user, the healthcare company may provide the requested information (i.e. appointment confirmation or test results) to the user. The requested information may be delivered to the user by an appropriate human operator (such as a receptionist, or healthcare professional) following authentication, delivered to the user as audio by using Text-to-Speech (TTS), or transmitted to the healthcare application running on the user's device 110.

Persons skilled in the art will appreciate that the ADE platform 130 may also provide additional functions to the contact centre 120. For example, the ADE platform 130 may comprise the functionality to tokenise a user's sensitive card details, in addition to authenticating the user. As another example, the ADE platform 130 may comprise the functionality of the PSP 210. With reference to the roadside assistance example described with reference to FIG. 8, the ADE platform 130 may provide an interface (such as ADE platform interface module 342) for the contact centre agent 330 to access the camera of the user device 110, for example to capture images. The ADE platform 130 or authentication server 510 may be located within the contact centre 120.

The above process enables the contact centre 120 to easily and securely share data with users. In addition, the multiple-factor authentication reduces the time required to start handling the user's request.

Returning, now, to the payment transaction example described above, the ADE platform 130 may further be operable, in a second embodiment, to handle transactions in which the merchant is using 3DS. If a merchant is using 3DS, a decision on whether to authenticate the user is made by the issuer 240. The 3DS specification stipulates that the authentication information is sent to the issuer 240 from the user, rather than the merchant. In this embodiment, the hosted platform further comprises a 3DS server 540. Compatibility with the 3DS process will be explained with reference to FIG. 9.

At step S-900, user order information is received and the user's payment method is identified. This step is equivalent to steps S-700 to S-714 of FIG. 7. Thus, the second embodiment is compatible with aspects of the first embodiment described above. The authentication server 510 determines that the merchant is using 3DS based on a configuration setting stored at the ADE platform 130 (for example, in the client database 512).

The process continues in step S-904, in which the contact centre agent 330 submits the order details to the authentication server 510 and the authentication server 510 associates the order details with other relevant transaction information. This transaction information may include the merchant name, the issuer bank identification number (BIN), the payment processing entity's merchant ID, the payment processing entity bank identification number (BIN), and the cardholder account number or token. The transaction information may also include a message extension field, containing at least the unique session ID for the transaction and an indication that a recorded sample of the user's speech is available for an out-of-band (OOB) voice biometric challenge.

In step S-906, the authentication server 510 sends the order details and associated relevant transaction information to the application 112 running on the user's device 110, along with a command to request 3DS authentication and to pass this request to the 3DS server 540. In step S-908, the application 112 passes the order details and associated relevant transaction information, along with information identifying the user's device 110, to the 3DS server 540 (for example, via the 3DS server interface 470). The information passed from the application 112 to the 3DS server 540 may be encrypted.

In step S-910, the 3DS server 540 sends all received information to the 3DS directory server 250, which routes the information to an appropriate issuer 3DS ACS 242, based on the issuer BIN. In step S-912, the issuer 3DS ACS 242 authenticates the device 110. Then, in step S-914, the issuer 3DS ACS 242 determines whether a challenge is necessary.

If no challenge is necessary, no authentication of the user takes place, and the transaction proceeds to authorisation (step S-922). If, however, the issuer 240 requests a challenge, the issuer 3DS ACS 242 uses a call to the 3DS server 540, for an OOB voice biometric check, in step S-916. The decision to request an OOB voice biometric challenge is based on the information in the message extension field. The request is passed from the 3DS server 540 to the authentication server 510. A notification may simultaneously be sent to the user's application 112, requesting that the user wait while the authentication is carried out.

In step S-918, the authentication processor 520 retrieves the call recording from the call recording data store 532. The authentication processor 520 authenticates the user using the call recording and the voice biometric stored in the user database 514. The authentication server 510 then responds to the issuer 3DS ACS 242, via the 3DS server 540, with a success or failure message.

In step S-920, the issuer 3DS ACS 242 continues with the transaction. The issuer 3DS ACS 242 may issue a notification to the issuer 240, the application 112, and the 3DS server 540, that the user and their device 110 have been successfully authenticated and that the transaction may proceed to authorisation. The application 112 may show a notification to the user, received from the issuer 3DS ACS 242 indicating whether the authentication was successful. The 3DS server 540 may confirm to the authentication server 510 that authentication was successful and that the transaction may proceed to authorisation.

The authentication server 510 passes the payment information to the payment processing entity 220, in step S-922, and subsequently receives a message indicating whether the transaction has been authorised or declined by the card issuer 240. The method finishes at step S-924, in which the contact centre agent 330 and, subsequently, the user, are notified whether the transaction has been authorised, and the authentication server 510 may delete the recorded sample from the call recording data store 532.

As with the first embodiment, other attributes (such as a fingerprint, a passcode, etc.) may be used instead of voice biometrics. The 3DS server 540 may define a hierarchy of user authentication attributes and may query the authentication server 510 to determine a 'fallback' authentication attribute in the event that a user cannot be authenticated using the default authentication attribute.

The process by which the user's device 110 is authenticated in step S-912 may be determined by a preference of the card issuer 240. For example, unique device information may have been sent to the card issuer 240, for future use as a device authentication attribute, when the user registered the payment method with the application 112. The card issuer 240 may authenticate the user's device using this attribute and the information identifying the user's device, sent from the application in step S-908, to authenticate the device. Alternatively, the card issuer 240 may use heuristic methods based on the information identifying the user's device 110, without comparing the identifying information against a pre-stored attribute.

The second embodiment described above provides the advantage that the contact centre 120 may reduce fees charged on payments, as the use of 3DS may reduce processing costs. In addition, the liability for potential fraud is shifted to a third party. For a card issuer 240, the multiple-factor authentication reduces the fraud risk associated with telephone-based transactions.

Figure 10:
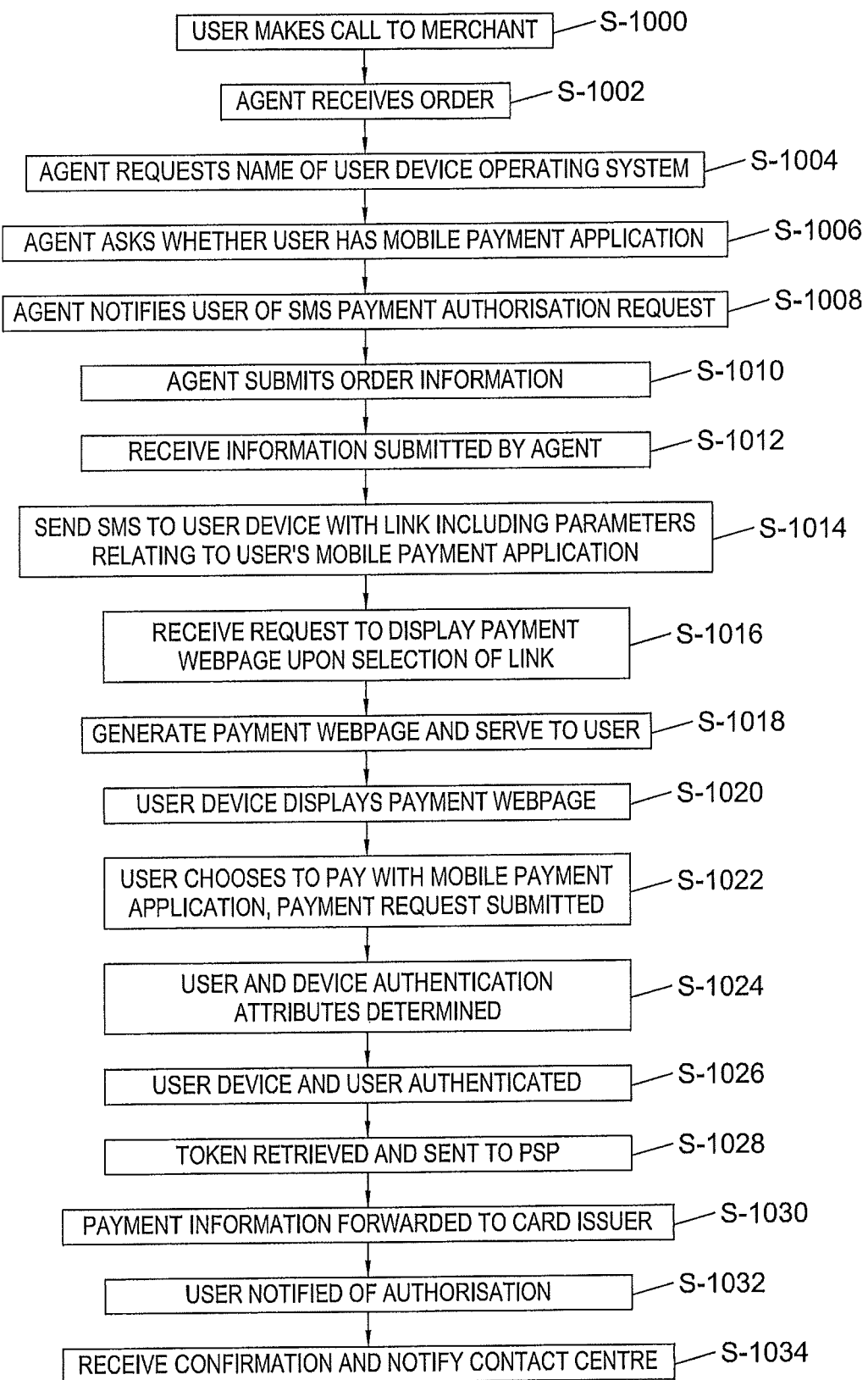
FIG. 10 is a flowchart of a method of authenticating a user in a payment transaction involving a third party application and third party authentication platform, according to one described embodiment.

The ADE platform 130 may further be operable, in a third embodiment, to provide the functionality for the processing of a telephone-based transaction in which the multiple-factor authentication is carried out by a third party. An example of the third embodiment is shown in FIG. 10.

In step S-1000, a call is received from a user and answered by an agent 330. In step S-1002, the user places an order and the agent 330 confirms the availability of the order. In step S-1004, the agent 330 detects that the user device 110 is a mobile phone, and requests the name of the operating system of the user's device 110. The user provides the name of the operating system, and the agent 330 enquires whether the user has a mobile payment application, in step S-1006. If so, the agent 330 selects an appropriate option on their terminal 334 and indicates that a payment authorisation request will be sent to the user's mobile telephone, in step S-1008.

In order to compile the payment authorisation request, the agent 330 types the order information into a CRM/order page displayed on the agent's terminal 334, in step S-1010. The order page is processed by the order management system 340 which sends the order information and telephone number (taken from the CLI or from computer telephony integration (CTI) data presented by the PBX 320) to the ADE platform 130, in step S-1012, via the ADE platform interface module 342. In step S-1014, the authentication processor 510 sends an SMS to the user's mobile telephone. The SMS contains a link which is selectable by the user. The link may contain parameters relating to the user's mobile payment application, and the order details.

Upon selection of the link by the user, a request is sent from the user's device to the authentication server 510 to display a payment webpage, in step S-1016. The request comprises the parameters relating to the user's mobile payment application, included in the link. In step S-1018, the authentication server dynamically generates the correct payment webpage for the user's mobile payment application and serves the payment webpage to the user's device 110. To generate the payment webpage, the authentication server 510 reads the parameters in the request and retrieves a template (which may be specific to the mobile payment application) from the template database 518. The retrieved template provides the appropriate formatting, display and functionality requirements for the payment webpage. In addition, the authentication server 510 retrieves information specifying the PSP 210 used by the merchant, and any information required by the PSP 210 (for example, a merchant ID for the PSP 210, or additional information so that a fraud check can be performed at the PSP 210). The information specifying the PSP 210 and the information required by the PSP 210 are included with the payment webpage.

In step S-1020, the user device 110 then displays the payment webpage in a browser (not shown) on the user device 110. In step S-1022, the user reads the order details in the browser and chooses an option to pay with the mobile payment application, from the list of possible payment options on the user device 110 and the possible payment options offered by the merchant. The payment request is then submitted to the mobile payment application by the browser.

The user chooses which payment method to use, if more than one payment method is stored within the mobile payment application. In step S-1024, the third party authentication platform 260 determines the user authentication attribute and device authentication attribute associated with the chosen payment method. In step S-1026, the third party authentication platform 260 authenticates the user device 110, and then authenticates the user (for example, by requesting a passcode).

A pre-stored token representing the user's payment method is retrieved from the user device 110 in step S-1028 and sent to the PSP 220. The PSP 220 then forwards the payment information to the card issuer 240 for detokenization and authorisation, in step S-1030. The third party authentication platform 260, upon receipt of confirmation, notifies the user that the payment has been authorised, in step S-1032. The user can view this confirmation in the third party application on the user device 110.

Confirmation is also sent from the PSP 220 to the authentication server 510, so that the ADE platform 130 can notify the contact centre 120, via the ADE platform interface module 342, that the order management system 340 can be updated with the payment information. The agent 330 informs the user that the payment was successful in step S-1034. Confirmation may further be displayed in the browser on the user device 110.

Persons skilled in the art will appreciate that the embodiment described with reference to FIG. 10 is also applicable to a scenario in which a user uses a landline telephone to call the contact centre 120. In this scenario, the user must have their device 110 to hand, so that they are able to click on the link upon receipt of the SMS in step S-1014. If the user is using a landline telephone, the agent may ask for the user to type in or say their mobile telephone number, prior to requesting the name of the operating system in step S-1004.

The process described with reference to FIG. 10 may be handled by an IVR system 310 instead of an agent 330, using speech recognition or keypresses to determine the user's operating system.

Information identifying the user device 110 (such as the CLI) may be detected in step S-1004. This information may be passed to the ADE platform 130 so that the authentication processor 520 can perform a lookup in the user database 514 in order to determine whether that user has provided their operating system in a previous transaction with that or another merchant. The user database 514 may further comprise an indication of whether the user has previously authorised the use of the mobile payment application running on their device 110 with that merchant. For example, the user may have selected an option presented during a previous transaction to use the mobile payment application for all future transactions with that merchant. Such a user preference may be recorded in the user preferences module 420.

Instead of sending an SMS to the user in step S-1014 with the link to the payment webpage, the user may receive an email containing a link to the webpage, or the agent 330 may read out a short URL for the user to enter. Persons skilled in the art will appreciate that various other methods of relaying the link to the payment webpage may be envisioned.

Further, the mobile payment application may not make use of a pre-stored token, in which case the user's card details may be forwarded to the PSP 210 by the mobile payment application in step S-1028.

As noted above, the payment transaction may involve multiple applications. For example, the payment method identified by the user may be a third party payment method associated with a third party payment application, such as the mobile payment application discussed with reference to FIG. 10. In this case, the application 112 interacts with the ADE platform 130 according to steps S-700 to S-714 of FIG. 7, so that the user's registered payment method is identified.

In step S-714, the registered payment method is identified as the mobile payment application. The application 112 then submits the payment request to the mobile payment application, which forwards the request to the third party authentication platform 260. The user chooses which payment method to use, if more than one payment method is stored within the mobile payment application, and the method then proceeds in accordance with steps S-1024 to S-1034 of FIG. 10.

Further, functionality of the third party authentication platform 260 may be implemented on the user device 110, such that user and device authentication associated with the payment method chosen within the mobile payment application may be an 'offline' process.

Figure 9:
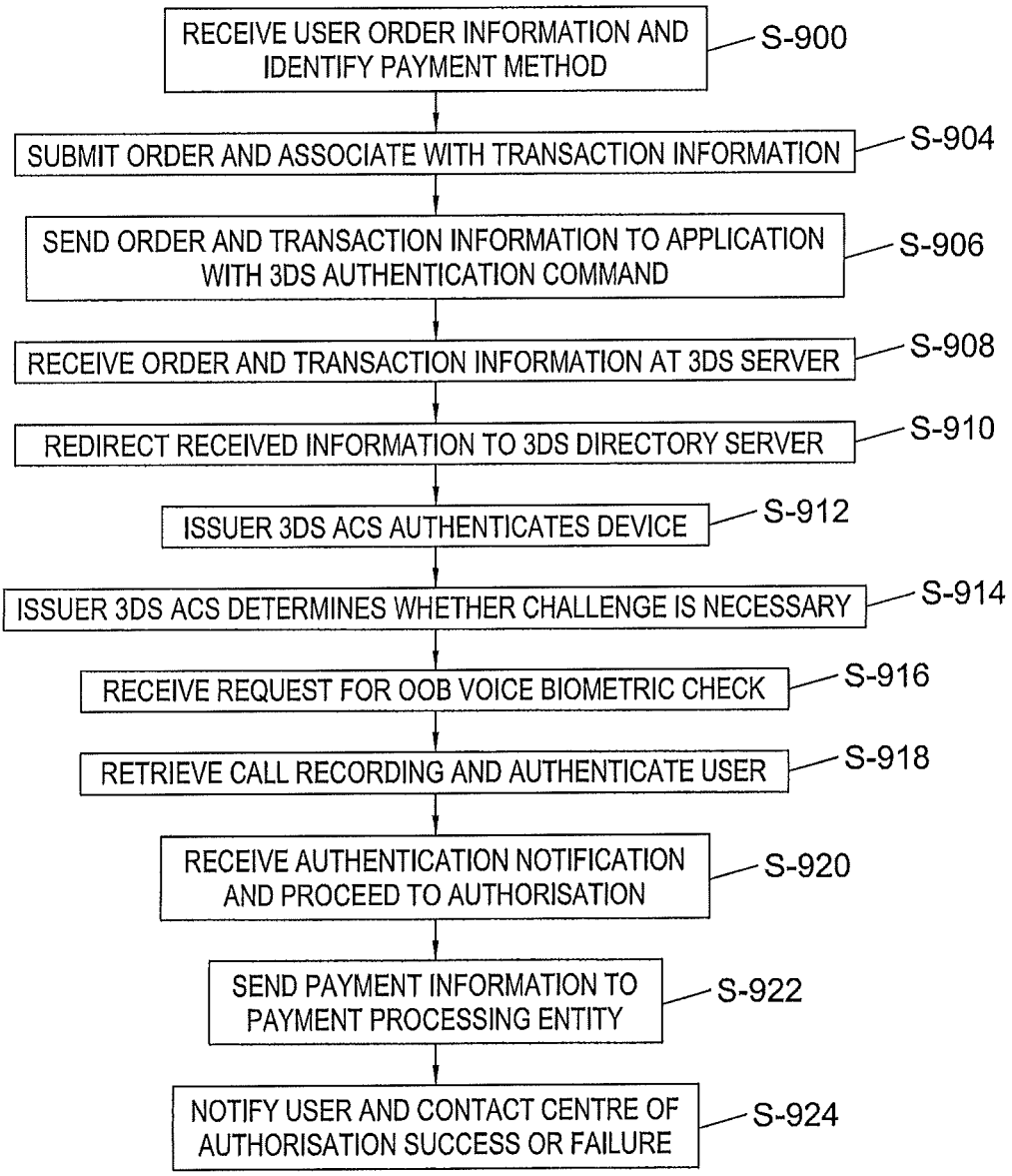
FIG. 9 is a flowchart of a method of authenticating a user in a payment transaction involving a merchant using 3-D Secure, according to one described embodiment.

Persons skilled in the art will appreciate that various alternatives discussed with reference to the first embodiment, described with reference to FIGS. 7 and 8, may also be applicable to the second and third embodiments, described in FIGS. 9 and 10.

The processes described with reference to FIGS. 7, 9 and 10 (that is, the payment transaction aspect of the first embodiment, and the second and third embodiments) enable a contact centre 120 to offer alternative payment methods, which are better aligned to the payment methods that their user base expects and wants to use.

The described embodiments can be incorporated into a specific hardware device, a general purpose device configure by suitable software, or a combination of both. Aspects can be embodied in a software product, either as a complete software implementation, or as an add-on component for modification or enhancement of existing software (such as a plug in). Such a software product could be embodied in a carrier medium, such as a storage medium (e.g. an optical disk or a mass storage memory such as a FLASH memory) or a signal medium (such as a download). Specific hardware devices suitable for the embodiment could include an application specific device such as an ASIC, an FPGA or a DSP, or other dedicated functional hardware means. The reader will understand that none of the foregoing discussion of embodiment limits future implementation on yet to be discovered or defined means of execution.

The disclosure has been described above with reference to specific embodiments. Persons skilled in the art, however, will understand that various modifications and changes may be made thereto without departing from the broader scope of the invention as set forth in the appended claims. The foregoing description and drawings are, accordingly, to be regarded in an illustrative rather than a restrictive sense.

The invention claimed is:

1. A method of facilitating the exchange of data between a user attempting to perform a transaction, the user having a computing device running an application, and a remote entity, wherein a first connection has been established between the user and the remote entity, and wherein the user has registered payment information on said application, the payment information defining a payment method for the transaction, the method comprising:
receiving a user authentication input associated with the payment method via the first connection;
identifying, by a server, the user associated with the user authentication input;
establishing, at the server, a second connection between the remote entity and the computing device;
sending a command to the application to request authentication of the user from a third party authentication server;
receiving a request from the application for authentication of the user;
directing the request for authentication of the user to the third party authentication server;
obtaining, from the computing device, a device authentication attribute, wherein the device authentication attribute is unique to the computing device;
authenticating, at the server, the computing device using the device authentication attribute; and
receiving an indication from the third party authentication server that the transaction may proceed to authorisation.

2. The method according to claim 1, wherein the request for authentication of the user is received from the third party authentication server.

3. The method according to claim 1, wherein the request from the application for authentication of the user is an encrypted request.

4. The method according to claim 1 further comprising, after receiving an indication that the user has been authenticated and the computing device has been authenticated, sending the payment information to a payment processing entity; and
receiving a notification that the transaction has been authorized or declined.

5. The method according to claim 1, wherein establishing the second connection between the remote entity and the computing device comprises establishing a connection between the remote entity and the application.

6. The method according to claim 1, wherein the user authentication input is received via an audio connection.

7. The method according to claim 6, wherein the user has registered a user authentication attribute associated with the payment method, the user authentication attribute comprising a voice biometric; and
wherein receiving the user authentication input comprises recording audio data from the user.

8. The method according to claim 7, wherein the user has associated a plurality of payment methods with the application, the method further comprising:
receiving a user selection of a payment method from the plurality of payment methods;
wherein receiving the user selection of the payment method comprises identifying the payment method from the recorded audio data.

9. The method according to claim 7, further comprising:
determining a unique property relating to the user or the computing device; and
retrieving the user authentication attribute from a database using the determined unique property.

10. The method according to claim 1, further comprising:
sending a command to the application to request authentication of the computing device from a third party authentication server;
receiving a request from the application for authentication of the computing device; and
directing the request for authentication of the computing device to the third party authentication server.

11. The method according to claim 1, further comprising:
receiving a second user authentication input; and
authenticating the user using the second user authentication input, optionally wherein the user authentication input and the second user authentication input correspond to different user authentication attributes.

12. A server for facilitating the exchange of data between a user attempting to perform a transaction and a remote entity, the user having a computing device running an application, and wherein a first connection has been established between the user and the remote entity, and wherein the user has registered payment information with the application, the payment information defining a payment method for the transaction, the server comprising an authentication processor operable to:
- receive a user authentication input associated with the payment method via the first connection;
- identify the user associated with the user authentication input;
- establish a second connection between the remote entity and the computing device;
- send a command to the application to request authentication of the user from a third party authentication server;
- receive a request from the application for authentication of the user;
  - direct the request for authentication of the user and authentication of the computing device to the third party authentication server;
  - obtain, from the computing device, a device authentication attribute, wherein the device authentication attribute is unique to the computing device;
- authenticate the computing device using the device authentication attribute; and
- receive an indication from the third party authentication server that the user and the computing device have been authenticated.

13. A method of facilitating the exchange of data between a user attempting to perform a transaction and a remote entity, the user having a computing device running an application, wherein a first connection has been established between the user and the remote entity, the method performed by the computing device and comprising:
- establishing, by the application, a second connection to a server;
- sending payment information to the server, the payment information defining a payment method for the transaction;
- sending a user authentication input associated with the payment method via the first connection;
- receiving a command from the server to request authentication of the user from a third party authentication server;
- generating a request for authentication of the user;
- sending the request for authentication of the user to the third party authentication server
- sending a device authentication attribute to the server, wherein the device authentication attribute is unique to the computing device;
- sending a unique property relating to the user or the computing device to the server for retrieval of a user authentication attribute associated with the payment method from a database.

14. The method according to claim 13, further comprising encrypting the request for authentication of the user.

15. The method according to claim 13, wherein:
- sending payment information to the server comprises receiving payment information from the user; and
  - sending the user authentication input via the first connection comprises receiving the user authentication input from the user.

16. The method according to claim 13, further comprising:
- sending at least one additional payment method to the server; and
- sending at least one user authentication attribute associated with the at least one additional payment method via the first connection.

17. The method according to claim 16, further comprising:
- selecting a payment method from a plurality of payment methods; and
- sending the selected payment method to the server.

18. The method according to claim 13, further comprising sending the user authentication input via an audio connection; and
optionally wherein:
receiving the user authentication input from the user comprises receiving audio data input by the user; and
sending the user authentication input via the first connection further comprises:
recording audio data input by the user;
generating a voice biometric based on the input audio data; and
sending the voice biometric to the server.

* * * * *